Patented July 11, 1933

1,917,410

UNITED STATES PATENT OFFICE

CHARLES S. WEBBER AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE DEHYDRATION OF ACETIC ACID

No Drawing.  Application filed September 26, 1929.  Serial No. 395,456.

This invention relates to a process for the dehydration of acetic acid and particularly to a process whereby the water present in acetic acid is removed by chemical means.

There have been various methods put forth in the past for commercial and laboratory processes for the dehydration of acetic acid solutions, many of which have been of little value to the industry. Distillation processes in which three-component azeotropic distillation is conducted appears at the present time to be of some commercial importance, while the fractional crystallization by freezing of the water from the acetic acid has been used somewhat extensively. All of these processes, however, are expensive and elaborate equipment is necessary for their economical operation.

One object of the present invention is to provide a process for the direct dehydration of acetic acid. Another object is to provide such a process in which the dehydration is quickly and economically effected without the necessity of elaborate equipment. Other objects will hereinafter appear.

We have found that aqueous acetic acid may be dehydrated by the formation of nitrosyl sulfuric acid within the aqueous acid solution. This acid may be formed by the action of an oxide of nitrogen and sulfur dioxide on the water in the acetic acid solution, with or without the presence of oxygen. At ordinary temperatures, nitrosyl sulfuric acid is crystalline and readily separates from the thus dehydrated acetic acid. This acid may be readily formed in the acetic acid by injecting thereinto an oxide of nitrogen, sulfur dioxide and oxygen. The reaction which takes place by the introduction of these gases may be represented as follows:

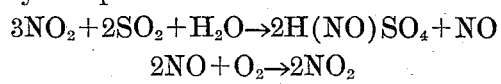

$$2NO + O_2 \rightarrow 2NO_2$$

As nitrosyl sulfuric acid $H(NO)SO_4$ can exist only momentarily in the presence of water, it forms therewith instantly sulfuric acid and oxide of nitrogen. This reaction is represented by the following equation:

It is obvious, therefore, that when crystals of nitrosyl sulfuric acid separate from a solution after the addition of these gases thereto, there can be no more water present in the acetic acid, otherwise the nitrosyl sulfuric acid would instantly break down into sulfuric acid and the oxides of nitrogen.

We have found that nitrogen dioxide, nitric peroxide (nitrogen tetroxide) or mixtures thereof, nitrogen monoxide, or even concentrated nitric acid may be used as equivalents of the nitrogen dioxide in this reaction. Sulfur trioxide may likewise be used. The oxygen may be introduced into the acetic acid in situ or carried by any inert gaseous medium, such, for example, as air.

It is advisable in conducting this dehydrating operation to introduce the gases, particularly if nitrogen dioxide and sulfur dioxide be employed, into the acetic acid in approximately equal molecular proportions. The amount to be injected will be determined, of course, by the amount of water present in the acetic acid, the reaction being complete when the crystals of nitrosyl sulfuric acid form. Other known methods of forming the nitrosyl sulfuric acid may likewise be employed but it should be borne in mind that no acids or gases should be added to the acetic acid solution that will combine directly with the acetic acid.

For some purposes it may be desirable to free the dehydrated acetic acid solution from the gases that have been absorbed therein. This may be readily accomplished by submitting the acid to distillation and preferably under the influence of a vacuum. The sulfuric acid which formed during the dehydrating process will remain behind in the still pot while the more volatile oxides of nitrogen may be readily rectified from the dehydrated acetic acid. Other methods of separating the acetic acid from the gaseous dehydrating agents will readily suggest themselves to those skilled in the art. The acetic acid may be used without removing the gases as in our acetylation process described in our copending application Serial No. 395,454, now Patent No. 1,866,686 of July 12, 1932, which describes a process of acetylation in which an oxide of nitrogen and an oxide of sulfur are present in the acetylation bath to catalyze the reaction.

We have found that this method of dehydrating acetic acid is particularly useful in processes for the esterification of cellulose. For example, in the manufacture of cellulose acetate, the cellulose is generally pretreated prior to acetylation. This pretreatment is carried out by various methods but it is usual to saturate the cellulose with acetic acid with or without the presence of a catalyst. As the cellulose contains approximately 8% moisture and the acetic acid may contain as much or more, the injection into this pretreating mass of an oxide of nitrogen, sulfur dioxide, and oxygen in suitable amounts will form the crystals of nitrosyl sulfuric acid and thus dehydrate the whole. This pretreated mass may, if desired, be then freed from the dehydrating gases and subsequently acetylated. As there will be no water in the preheated mass to destroy the effect of part of the acetic anhydride required for complete acetylation, a considerable saving in this chemical will be effected. The pretreated cellulose may likewise be acetylated without the removal of the oxide of nitrogen and sulfur dioxide as is fully described in our copending application, Serial No. 395,454, now Patent No. 1,866,686 of July 12, 1932.

The acetic acid as dehydrated by this process may be used directly for the acetylation of cellulose as described in our copending application cited above as the presence of sulfur dioxide and nitrogen dioxide in the cellulose makes their addition as a catalyst unnecessary.

Various changes may be made in the manner of introducing these gases into the acetic acid, or known equivalents of these gases may be used while other methods may be employed for the formation of the nitrosyl sulfuric acid in the acetic acid without in any way departing from the scope of this invention or sacrificing any of the advantages that may be derived therefrom.

Having thus described our invention, what we claim as new and desire to secure by Letters Patent is:

1. A process for dehydrating acetic acid which comprises treating dilute acetic acid with sulfur dioxide and an oxide of nitrogen until nitrosyl sulfuric acid separates.

2. A process for dehydrating acetic acid which comprises treating dilute acetic acid with sulfur dioxide, an oxide of nitrogen and oxygen until nitrosyl sulfuric acid separates.

3. A process for dehydrating acetic acid which comprises treating an aqueous acetic acid with sulfur dioxide and introgen dioxide until nitrosyl sulfuric acid separates.

4. A process for dehydrating acetic acid which comprises treating aqueous acetic acid with sulfur dioxide, an oxide of nitrogen and a material containing readily available oxygen until nitrosyl sulfuric acid separates.

5. A process for dehydrating aqueous acetic acid which comprises forming nitrosyl sulfuric acid therein.

6. A process for dehydrating aqueous acetic acid which comprises separating from the acetic acid, nitrosyl sulfuric acid crystals which have been formed with the water originally present in the acetic acid.

7. A process for dehydrating acetic acid which comprises treating aqueous acetic acid with sulfur dioxide, an oxide of nitrogen and air until nitrosyl sulfuric acid separates.

8. A process for dehydrating acetic acid which comprises treating dilute acetic acid with an oxide of sulfur and an oxide of nitrogen until nitrosyl sulfuric acid separates.

Signed at Rochester, New York, this 21st day of September, 1929.

CHARLES S. WEBBER.
CYRIL J. STAUD.